(12) United States Patent
Sato

(10) Patent No.: US 11,168,405 B2
(45) Date of Patent: Nov. 9, 2021

(54) METHOD OF FORMING NICKEL FILM AND NICKEL SOLUTION USED FOR THE METHOD

(71) Applicant: TOYOTA JIDOSHA KABUSHIKI KAISHA, Toyota (JP)

(72) Inventor: Yuki Sato, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/864,117

(22) Filed: Jan. 8, 2018

(65) Prior Publication Data
US 2018/0274115 A1    Sep. 27, 2018

(30) Foreign Application Priority Data
Mar. 23, 2017   (JP) .............................. JP2017-057862

(51) Int. Cl.
*C25D 3/12*  (2006.01)
*C25D 5/00*  (2006.01)
(Continued)

(52) U.S. Cl.
CPC .............. *C25D 3/12* (2013.01); *B32B 15/017* (2013.01); *B32B 15/20* (2013.01); *C25D 5/06* (2013.01);
(Continued)

(58) Field of Classification Search
CPC .................................... C25D 3/12; C25D 5/00
(Continued)

(56) References Cited

U.S. PATENT DOCUMENTS 2,351,966 A * 6/1944 Hogaboom ............... C25D 3/12
                                                                  205/271
4,626,324 A * 12/1986 Samuels ................... C25D 3/56
                                                                  205/125
(Continued)

FOREIGN PATENT DOCUMENTS

CN   102719868 A  * 10/2012 ............. C25D 17/16
CN   104011269 A     8/2014
(Continued)

OTHER PUBLICATIONS

Kadaner, Handbook for Electroplating, Kiev, "Technika," 1976, p. 155 para. 10, p. 126 table 2, composition 2. (Year: 1976).*
(Continued)

*Primary Examiner* — Edna Wong
(74) *Attorney, Agent, or Firm* — Sughrue Mion, PLLC

(57) ABSTRACT

A nickel film is formed on the surface of a metal substrate with a solid electrolyte membrane in contact with a metal substrate while suppressing the corrosion taking place on the metal substrate by a method of forming a nickel film comprising: disposing an anode, a metal substrate that functions as a cathode, and a solid electrolyte membrane comprising a solution that contains nickel ions and chloride ions, such that the solid electrolyte membrane is disposed between the anode and the metal substrate and in contact with the surface of the metal substrate; and applying a voltage between the anode and the metal substrate, so as to form a nickel film on the surface of the metal substrate that is in contact with the solid electrolyte membrane, wherein the concentration of the chloride ions is 0.002 to 0.1 mol/l.

13 Claims, 5 Drawing Sheets

(51) Int. Cl.
*C25D 5/06* (2006.01)
*B32B 15/01* (2006.01)
*B32B 15/20* (2006.01)
*C25D 17/00* (2006.01)

(52) U.S. Cl.
CPC ........ *C25D 17/002* (2013.01); *B32B 2255/06* (2013.01); *B32B 2255/205* (2013.01)

(58) Field of Classification Search
USPC ........................................................ 205/271
See application file for complete search history.

(56) References Cited

U.S. PATENT DOCUMENTS

| | | | |
|---|---|---|---|
| 5,897,763 A | 4/1999 | Elligsen et al. | |
| 5,985,124 A * | 11/1999 | Yoda .................. | C23C 2/02 205/118 |
| 6,239,948 B1 * | 5/2001 | Wu ..................... | G11B 5/235 360/119.11 |
| 6,383,661 B2 * | 5/2002 | Wittebrood ......... | B23K 35/0238 205/255 |
| 2002/0012811 A1 * | 1/2002 | Wittebrood ......... | B23K 35/0238 428/652 |
| 2003/0213699 A1 | 11/2003 | Kondo et al. | |
| 2007/0294874 A1 * | 12/2007 | Yang .................. | C25D 7/04 29/421.1 |
| 2012/0164479 A1 * | 6/2012 | Prinz ................. | C25D 15/00 428/640 |
| 2012/0318341 A1 * | 12/2012 | Fisher ............... | H01L 31/02167 136/256 |
| 2013/0327435 A1 | 12/2013 | Kaneta et al. | |
| 2015/0014178 A1 * | 1/2015 | Hiraoka .............. | C25D 17/005 205/261 |
| 2015/0218723 A1 | 8/2015 | Miura et al. | |
| 2016/0102414 A1 | 4/2016 | Tani et al. | |
| 2016/0186353 A1 | 6/2016 | Sato et al. | |
| 2016/0237582 A1 * | 8/2016 | Hiraoka .............. | C25D 7/12 |

FOREIGN PATENT DOCUMENTS

| | | | |
|---|---|---|---|
| CN | 105492665 A | 4/2016 | |
| CN | 105734655 A | 7/2016 | |
| DE | 3840310 A1 | 7/1989 | |
| JP | 61-147896 A | 7/1986 | |
| JP | 05-5198 A | 1/1993 | |
| JP | 09-202987 A | 8/1997 | |
| JP | 2005-5198 A | 1/2005 | |
| JP | 2012-117105 A | 6/2012 | |
| JP | 2012117105 A * | 6/2012 | ............... C25D 1/00 |
| JP | 2012-219362 A | 11/2012 | |
| JP | 2013-253306 A | 12/2013 | |
| JP | 2015004094 A * | 1/2015 | ............... C25D 3/12 |
| JP | 2015-092012 A | 5/2015 | |
| JP | 2016-132788 A | 7/2016 | |
| JP | 2017-197821 A | 11/2017 | |
| KR | 20030057400 A | 7/2003 | |
| KR | 2015-0091997 A | 8/2015 | |
| WO | 2014/178396 A1 | 11/2014 | |

OTHER PUBLICATIONS

Da Silva et al., "Simultaneous Determination of pH, Chloride and Nickel in Electroplating Baths Using Sequential Injection Analysis," Analytics Chimica Acta (2004), vol. 506, pp. 197-202. (Year: 2004).*

Proud et al., "Influence of pH on Nickel Electrodeposition at Low Nickel(II) Concentrations," Journal of Applied Electrochemistry (1995), vol. 25, No. 25, pp. 770-775. (Year: 1995).*

Bolger et al., "Electrochemical Treatment and Reuse of Nickel Plating Rinse Waters," Environmental Progress (Oct. 2002), vol. 21, No. 3, pp. 203-208. (Year: 2002).*

Abstract of IN 184930 B (Oct. 2000), pp. 1-2. (Year: 2000).*

Watanabe et al., "Investigation for Substitution Agents of Boric Acid in Nickel Sulfamate Bath," Hyomen Gijutsu (2007), vol. 58, No. 5, pp. 317-324. Abstract Only. (Year: 2007).*

Watanabe et al., "Investigation for Substitution Agents of Boric Acid in Nickel Sulfamate Bath," Hyomen Gijutsu (2007), vol. 58, No. 5, pp. 317-324. (Year: 2007).*

Doi et al., "Investigation of Substitution Agents in Place of Boric Acid in a Nickel Plating Bath," Journal of The Surface Finishing Society of Japan (Jul. 1, 2000), vol. 51, No. 7, pp. 718-723. (Year: 2000).*

Kadaner, et al., "Handbook for Electroplating. Kiev", 'Technika' Publisher, 1976, p. 155, para. 10, p. 156 table 56, composition 2 (5 pages).

* cited by examiner

METHOD OF FORMING NICKEL FILM AND NICKEL SOLUTION USED FOR THE METHOD

CROSS REFERENCE TO RELATED APPLICATIONS

The present application claims priority from Japanese patent application JP 2017-057862 filed on Mar. 23, 2017, the content of which is hereby incorporated by reference into this application.

BACKGROUND

Field

Exemplary embodiments relate to a method of forming a nickel film and a nickel solution used for the method of forming a nickel film.

Description of Related Art

Nickel has excellent physical properties. Thus, various substrates comprise nickel films formed on the surfaces thereof.

For example, JP 2013-253306 A discloses a method of producing a coated stainless steel member comprising plating a stainless steel substrate with a Woods strike nickel solution and treating the formed Woods strike nickel plating layer via cation electrodeposition coating.

JP 2012-219362 A discloses a method of forming a metal film comprising applying a voltage between the cathode substrate and the anode substrate disposed to sandwich a solid electrolyte membrane comprising a solid electrolyte and a metal ion, so as to reduce the metal ions and allow metal to deposit on the cathode substrate, although the metal film is not limited to a nickel film.

JP 2015-92012 A discloses that the method disclosed in JP 2012-219362 A is performed with the use of a nickel solution with a given pH level, in order to dissolve the problems caused when the method disclosed in JP 2012-219362 A is performed with the use of a nickel solution (i.e., generation of hydrogen gas between a solid electrolyte membrane and a substrate).

SUMMARY

When a nickel film is formed on the surface of a metal substrate while a solid electrolyte membrane is kept in contact with a metal substrate (in particular, an aluminum substrate) as described in, for example, JP 2012-219362 A and JP 2015-92012 A, it was found that corrosion would take place on the metal substrate.

Accordingly, the present disclosure is intended to form a nickel film on the surface of a metal substrate with a solid electrolyte membrane in contact with the metal substrate while suppressing the corrosion taking place on the metal substrate.

A cause of corrosion of the metal substrate was found to be chloride ions contained in a nickel solution. Upon removal of chloride ions from a nickel solution, it was also found that the rate of nickel film formation would significantly decrease. Accordingly, as the result of considering the concentration of the chloride ions in detail, the chloride ion concentration at which corrosion taking place on the metal substrate could be suppressed while maintaining or improving the formation rate of nickel film was found. The chloride ion concentration found in the present disclosure was significantly different from the concentration adopted for conventional methods for nickel film formation.

The present disclosure provides the following.

[1] A method of forming a nickel film comprising: disposing an anode, a metal substrate that functions as a cathode, and a solid electrolyte membrane comprising a solution that contains nickel ions and chloride ions, such that the solid electrolyte membrane is disposed between the anode and the metal substrate and in contact with the surface of the metal substrate; and applying a voltage between the anode and the metal substrate, so as to form a nickel film on the surface of the metal substrate that is in contact with the solid electrolyte membrane, wherein the concentration of the chloride ions is 0.002 to 0.1 mol/l.

[2] The method of forming a nickel film according to [1], wherein the concentration of the chloride ions is 0.01 to 0.06 mol/l.

[3] The method of forming a nickel film according to [1] or [2], wherein the solution has a pH level of 2.5 to 4.25.

[4] The method of forming a nickel film according to [3], wherein the solution has a pH level of 3 to 4.

[5] The method of forming a nickel film according to any of [1] to [4], wherein the metal substrate is an aluminum substrate.

[6] A solution comprising nickel ions and chloride ions used for the method of forming a nickel film comprising: disposing an anode, a metal substrate that functions as a cathode, and a solid electrolyte membrane comprising a solution that contains nickel ions and chloride ions, such that the solid electrolyte membrane is disposed between the anode and the metal substrate and in contact with the surface of the metal substrate; and applying a voltage between the anode and the metal substrate, so as to form a nickel film on the surface of the metal substrate that is in contact with the solid electrolyte membrane, wherein the concentration of the chloride ions is 0.002 to 0.1 mol/l.

[7] The solution according to [6], wherein the concentration of the chloride ions is 0.01 to 0.06 mol/l.

[8] The solution according to [6] or [7], wherein the solution has a pH level of 2.5 to 4.25.

[9] The solution according to [8], wherein the solution has a pH level of 3 to 4.

The solution according to any of [6] to [9], wherein the metal substrate is an aluminum substrate.

According to the present disclosure, a nickel film can be formed on the surface of a metal substrate with a solid electrolyte membrane in contact with a metal substrate while suppressing the corrosion taking place on the metal substrate.

DETAILED DESCRIPTION

Figure 1A:
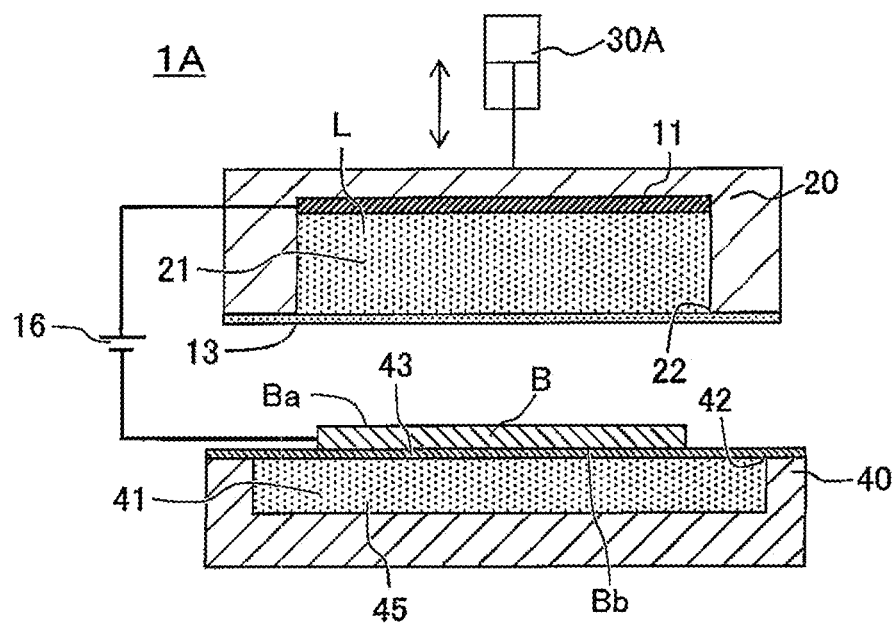
FIG. 1A is a schematic cross-sectional view of a film-forming apparatus 1A.

Exemplary embodiments relate to a method of forming a nickel film comprising: disposing an anode, a metal substrate that functions as a cathode, and a solid electrolyte membrane comprising a solution that contains nickel ions ($Ni^{2+}$) and chloride ions ($Cl^-$) (hereafter, it is also referred to as a "nickel solution"), such that the solid electrolyte membrane is disposed between the anode and the metal substrate and in contact with the surface of the metal substrate; and applying a voltage between the anode and the metal substrate so as to form a nickel film on the surface of the metal substrate that is in contact with the solid electrolyte membrane, and a nickel solution used for the method of forming a nickel film. In the exemplary embodiments, the chloride ion concentration in the nickel solution is 0.002 to 0.1 mol/l.

In the exemplary embodiments, applying a voltage to a site between the anode and the metal substrate (i.e., the cathode) allows nickel ions contained in the solid electrolyte membrane to be reduced on the surface of the metal substrate that is in contact with the solid electrolyte membrane. As a result, nickel is deposited on the metal substrate surface, and a nickel film is then formed. In such a case, the corrosion taking place on the metal substrate can be suppressed by setting the concentration of chloride ions at 0.002 to 0.1 mol/l.

A Watts bath that has generally been used to form a nickel film contains approximately 1 mol/l of chloride ions. In the past, however, the corrosion did not take place on the metal substrate even if a nickel film was formed with the use of a Watts bath. On the other hand, when attempting to form a nickel film while keeping the solid electrolyte membrane in contact with the metal substrate as in the case of the exemplary embodiments, corrosion would take place on the metal substrate. Thus, such corrosion is considered to be specific to the method in which the solid electrolyte membrane is brought into contact with the metal substrate. Such corrosion is considered to take place because the metal substrate surface is activated upon contact between a metal substrate and a solid electrolyte membrane.

In the exemplary embodiments, examples of the anode that can be used herein include a nickel anode, a sulfur-containing nickel anode, a carbon-containing nickel anode, and a depolarized nickel anode. A soluble or insoluble anode may be used.

In the exemplary embodiments, examples of the metal substrate (cathode) that can be used herein include a base metal substrate. Examples of the base metal include aluminum, zinc, and iron. In the exemplary embodiments, an aluminum substrate is preferable, but the substrate is not particularly limited thereto. This is because corrosion remarkably takes place on an aluminum substrate. The base metal substrate may comprise a base metal at least on its surface.

In the exemplary embodiments, examples of solid electrolyte membrane that can be used herein include fluorinated resins such as Nafion® (DuPont), hydrocarbon resins, polyamic acid resins, and resins capable of cation exchange such as Selemion (CMV, CMD, and CMF series) (Asahi Glass Co., Ltd).

In the exemplary embodiments, a thickness of the solid electrolyte membrane can be, for example, 50 to 400 μm, and 100 to 200 μm.

In the exemplary embodiments, the solid electrolyte membrane comprises a nickel solution comprising nickel ions and chloride ions.

In the exemplary embodiments, the nickel ion concentration in the nickel solution can be, for example, 0.1 to 8 mol/l, 0.3 to 4 mol/l, or 0.5 to 2 mol/l. Examples of nickel ion sources include nickel salts, such as nickel chloride, nickel sulfate, and nickel acetate. Alternatively, nickel ions generated upon dissolution of nickel anodes may be used.

In the exemplary embodiments, the chloride ion concentration in the nickel solution is 0.002 to 0.1 mol/l, and it is preferably 0.01 to 0.06 mol/l. Setting the chloride ion concentration to such range allows the area of the nickel film normally formed to be enlarged. Examples of chloride ion sources include nickel chloride, hydrochloric acid, sodium chloride, and potassium chloride.

In the exemplary embodiments, the nickel solution has a pH of preferably 2.5 to 4.25, and particularly preferably 3 to 4. Thus, the nickel deposition current efficiency can be improved.

In the exemplary embodiments, the nickel solution may comprise any other components, in addition to nickel ions and chloride ions. For example, the nickel solution may comprise a solvent and a pH buffer solution. Examples of the solvent include water and ethanol. Examples of pH buffer solutions include an acetic acid-nickel acetate buffer solution and a succinic acid-nickel succinate buffer solution.

A method of forming a metal film on the surface of a metal substrate through application of a voltage to a site between an anode and a metal substrate while keeping the solid electrolyte membrane in contact with the metal substrate (i.e., the cathode) and an apparatus used for such method have already been reported. For example, the methods and the apparatuses disclosed in JP 2012-219362 A, JP 2015-92012 A, and JP 2014-051701 A may be used to implement the method according to the exemplary embodiments.

Figure 1B:
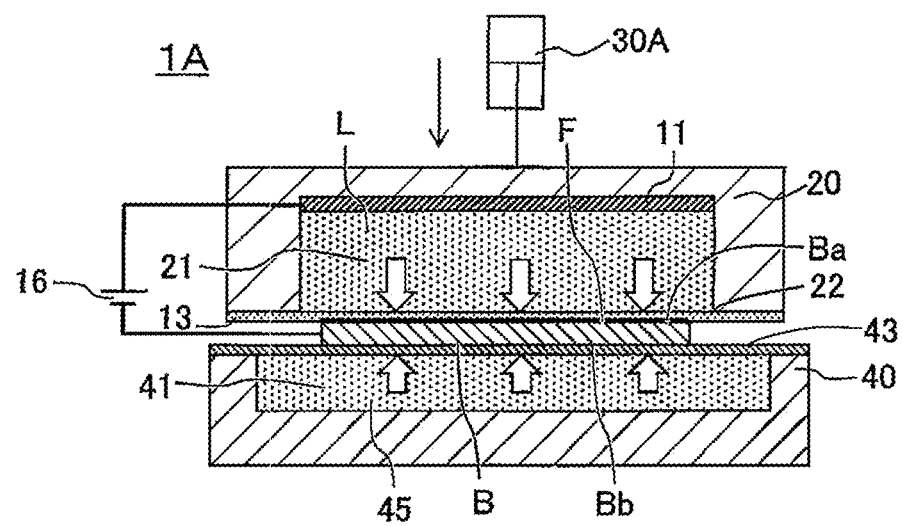
FIG. 1B shows a process of forming a nickel film on the surface of a metal substrate with the use of the film-forming apparatus 1A shown in FIG. 1A.

Alternatively, the method according to the exemplary embodiments can be implemented with the use of the apparatuses shown in FIG. 1A and FIG. 1B.

FIG. 1A shows a schematic cross-sectional view of a film-forming apparatus 1A. The film-forming apparatus 1A comprises an anode 11, a metal substrate B that functions as a cathode, a solid electrolyte membrane 13 disposed between the anode 11 and the metal substrate B, and a power supply unit 16 that applies a voltage to a site between the anode 11 and the metal substrate B.

The film-forming apparatus 1A further comprises a housing 20. The housing 20 comprises a first accommodation unit 21 that accommodates a nickel solution L such that the nickel solution L is disposed between the anode 11 and the solid electrolyte membrane 13. The nickel solution L accommodated in the first accommodation unit 21 is in contact with the solid electrolyte membrane 13 and the anode 11.

In the first accommodation unit 21, a first aperture 22 which is larger than a surface Ba of the metal substrate B is provided. The first aperture 22 is covered with the solid electrolyte membrane 13, and the nickel solution L is sealed in the first accommodation unit 21 in a flowable manner.

The film-forming apparatus 1A further comprises a loading table 40 on which the metal substrate B is placed. The loading table 40 comprises: a surface Ba; a back surface Bb on the opposite side of the surface Ba; and a second accommodation unit 41 that accommodates fluid 45 provided on the back surface Bb through a thin film 43.

In the second accommodation unit 41, a second aperture 42 which is larger than the back surface Bb is provided. The second aperture 42 is covered with the thin film 43, and the fluid 45 is sealed in the second accommodation unit 41 in a flowable manner.

The film-forming apparatus 1A further comprises a pressure unit 30A on top of the housing 20.

FIG. 1B illustrates a process of forming a nickel film F on the surface Ba of the metal substrate B with the use of the film-forming apparatus 1A shown in FIG. 1A.

As shown in FIG. 1B, the loading table 40 and the housing 20 are allowed to move relative to each other while placing the metal substrate B on the loading table 40, the metal substrate B is sandwiched between the solid electrolyte membrane 13 and the thin film 43, and the nickel solution L is disposed on the surface Ba of the metal substrate B through the solid electrolyte membrane 13.

Subsequently, a voltage is applied from the power supply unit 16 to a site between the anode 11 and the metal substrate B, nickel ions contained in the solid electrolyte membrane 13 is reduced on the surface Ba of the metal substrate B, and nickel is deposited on the surface Ba. Thus, the nickel film F is formed.

EXAMPLES

Hereafter, the present disclosure is described in more detail with reference to examples and comparative examples, although the technical scope of the present disclosure is not limited to these examples.

[Nickel Film Formation]

Nickel films were formed with the use of the film-forming apparatus shown in FIGS. 1A and 1B under the conditions shown in Table 1 below.

TABLE 1

| Anode | Pure nickel foil |
|---|---|
| Cathode (metal substrate) | Si substrate with Al—Si (1%) sputtered membrane*1 (sputtering thickness: 5 μm) (zincate-treated) |
| Current density | 100 mA/cm² |
| Treatment duration | 2 min |
| Pressure | About 0.5 MPa |

*1: Si substrate composed of an Si membrane and an Al membrane provided thereon

Details concerning the nickel solutions used in the examples and in the comparative examples are as shown in Tables 2 and 3.

TABLE 2

|  | Comp. Ex. 1 | Comp. Ex. 2 | Ex. 1 | Ex. 2 | Ex. 3 | Ex. 4 | Ex. 5 |
|---|---|---|---|---|---|---|---|
| Nickel chloride (mol/l) | 0.950 | 0.500 | 0.050 | 0.030 | 0.010 | 0.005 | 0.001 |
| Nickel sulfate (mol/l) | — | 0.450 | 0.900 | 0.920 | 0.940 | 0.945 | 0.949 |

TABLE 2-continued

|  | Comp. Ex. 1 | Comp. Ex. 2 | Ex. 1 | Ex. 2 | Ex. 3 | Ex. 4 | Ex. 5 |
|---|---|---|---|---|---|---|---|
| Nickel acetate (mol/l) | 0.050 | 0.050 | 0.050 | 0.050 | 0.050 | 0.050 | 0.050 |
| Cl⁻ (mol/l) | 1.900 | 1.000 | 0.100 | 0.060 | 0.020 | 0.010 | 0.002 |
| pH | 4.00 | 4.00 | 4.00 | 4.00 | 4.00 | 4.00 | 4.00 |

TABLE 3

|  | Ex. 6 | Ex. 7 | Ex. 8 | Ex. 9 | Ex. 10 | Ex. 11 |
|---|---|---|---|---|---|---|
| Nickel chloride (mol/l) | 0.010 | 0.010 | 0.010 | 0.010 | 0.010 | 0.010 |
| Nickel sulfate (mol/l) | 0.940 | 0.940 | 0.940 | 0.940 | 0.940 | 0.940 |
| Nickel acetate (mol/l) | 0.050 | 0.050 | 0.050 | 0.050 | 0.050 | 0.050 |
| Cl⁻ (mol/l) | 0.020 | 0.020 | 0.020 | 0.020 | 0.020 | 0.020 |
| pH | 2.50 | 2.75 | 3.00 | 3.50 | 4.25 | 4.50 |

[Nickel Film Evaluation Method 1]

The area of a normal nickel film (%) was determined with reference to the following equation.

$$\text{Area of normal nickel film (\%)} = [1 - (\text{"area of abnormal nickel film"}/\text{"area of treated cathode"})] \times 100$$

The term "area of abnormal nickel film" refers to a total area of regions in which the nickel films (1) to (4) described below are not normally formed.

(1) A region that is in close contact with a nickel film from which the solid electrolyte membrane is not separated (hereafter, such region is referred to as "adhesion region");

(2) a region in which discoloration has taken place due to abnormal deposition of hydroxide or the like (hereafter, such region is referred to as "discoloration region");

(3) a region in which the nickel film is not formed (or deposited) (hereafter, such region is referred to as "undeposited region"); and (4) a region in which the metal substrate is corroded (hereafter, referred to as "corrosion region").

The nickel deposition current efficiency was determined based on the equation shown below.

$$\text{(Nickel deposition current efficiency)} = [(\text{actual weight of deposition (g)})/(\text{theoretical weight of deposition (g)})] \times 100$$

The actual weight of deposition was determined by completely dissolving the deposited nickel film in nitric acid, measuring the concentration of nickel in the nitric acid solution with the use of the inductively coupled plasma (ICP) emission spectrometer, and converting the measured concentration in terms of weight.

The theoretical weight of deposition was determined in accordance with the equation shown below (i.e., Faraday's laws of electrolysis).

$$\text{(Theoretical weight of deposition (g))} = [\text{current (A)} \times \text{time (t)}]/[\text{ion valence} \times \text{Faraday constant (C/mol)}] \times \text{nickel molecular weight (g/mol)}$$

[Evaluation Results 1]

FIGS. 2A to 2G show photographs and phase diagrams of the nickel films obtained in Comparative Examples 1 and 2 and Examples 1 to 5.

Figure 2A:
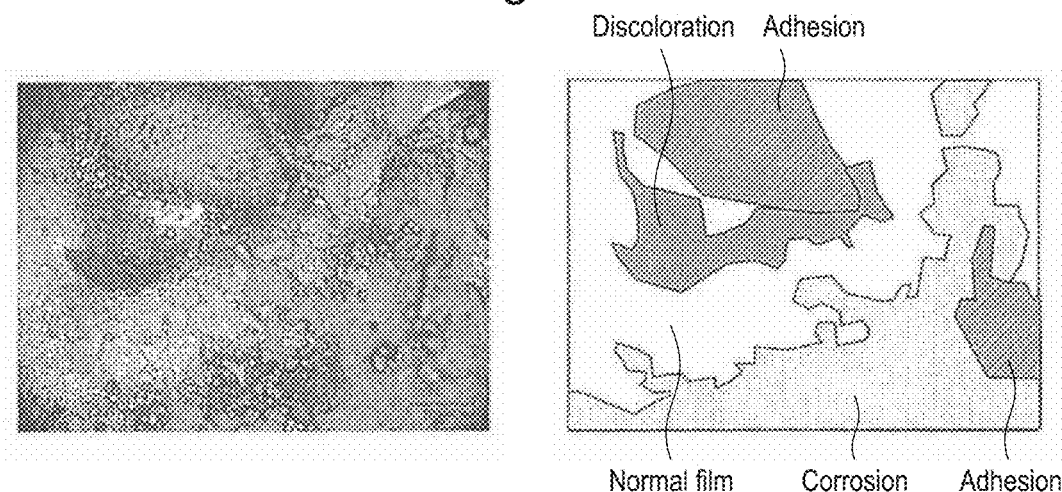
FIG. 2A shows a photograph and a phase diagram of a nickel film obtained in Comparative Example 1.

In Comparative Example 1 (chloride ion concentration: 1.9 mol/l), as shown in FIG. 2A, the corrosion region, the adhesion region, and the discoloration region were large. Thus, it was difficult to normally form a nickel film.

Figure 2B:
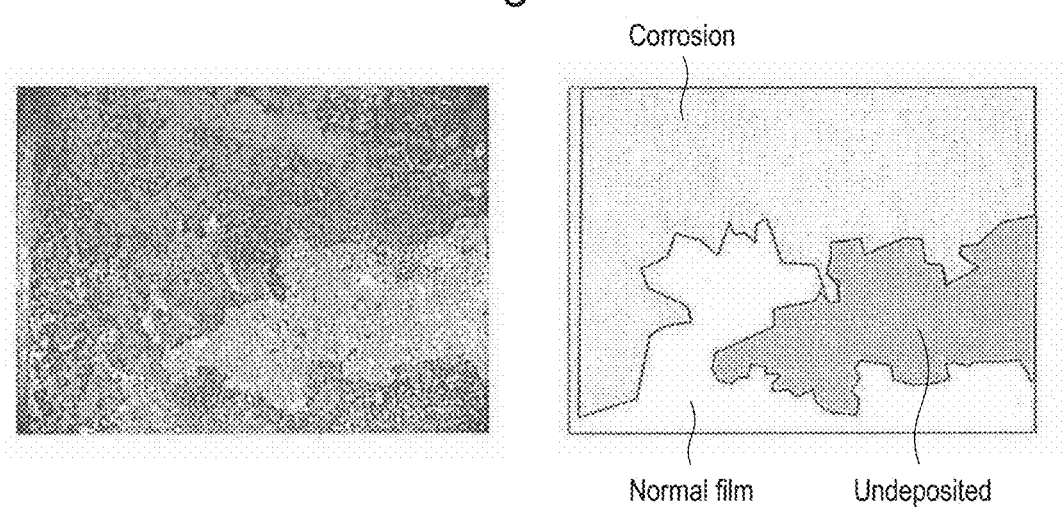
FIG. 2B shows a photograph and a phase diagram of a nickel film obtained in Comparative Example 2.

In Comparative Example 2 (chloride ion concentration: 1 mol/l), as shown in FIG. 2B, the corrosion region was significantly enlarged. Thus, it was difficult to normally form a nickel film.

Figure 2C:
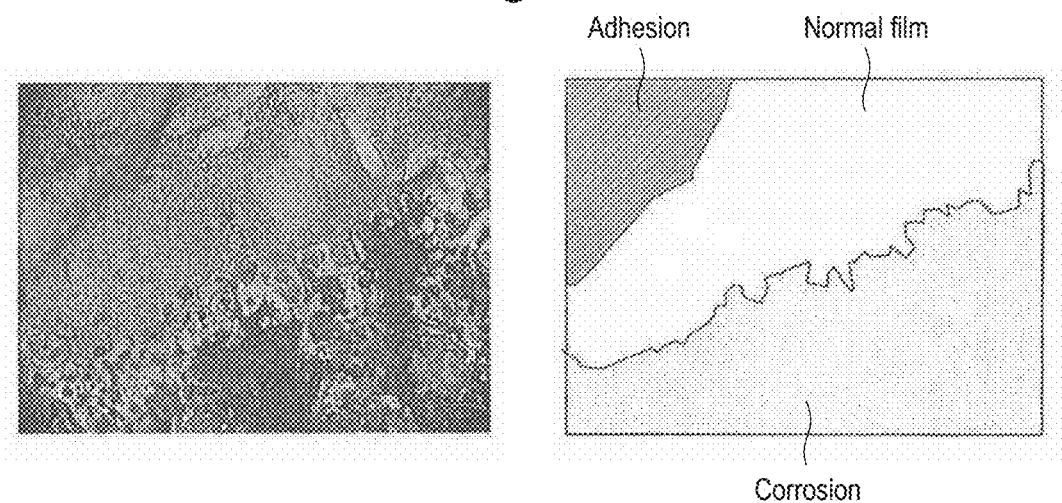
FIG. 2C shows a photograph and a phase diagram of a nickel film obtained in Example 1.

In Example 1 (chloride ion concentration: 0.1 mol/l), as shown in FIG. 2C, although the corrosion region and the adhesion region were present, the area of the normally formed nickel film increased.

Figure 2D:
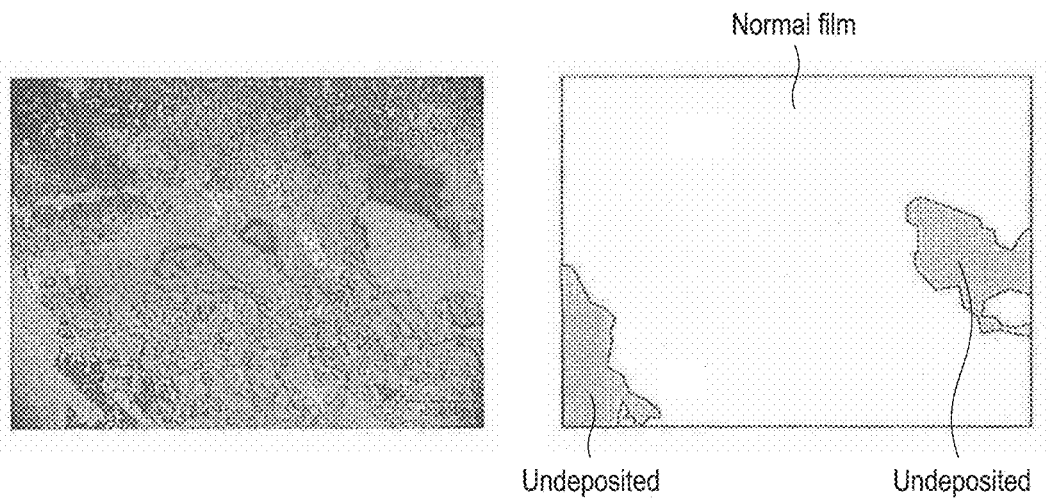
FIG. 2D shows a photograph and a phase diagram of a nickel film obtained in Example 2.
Figure 2E:
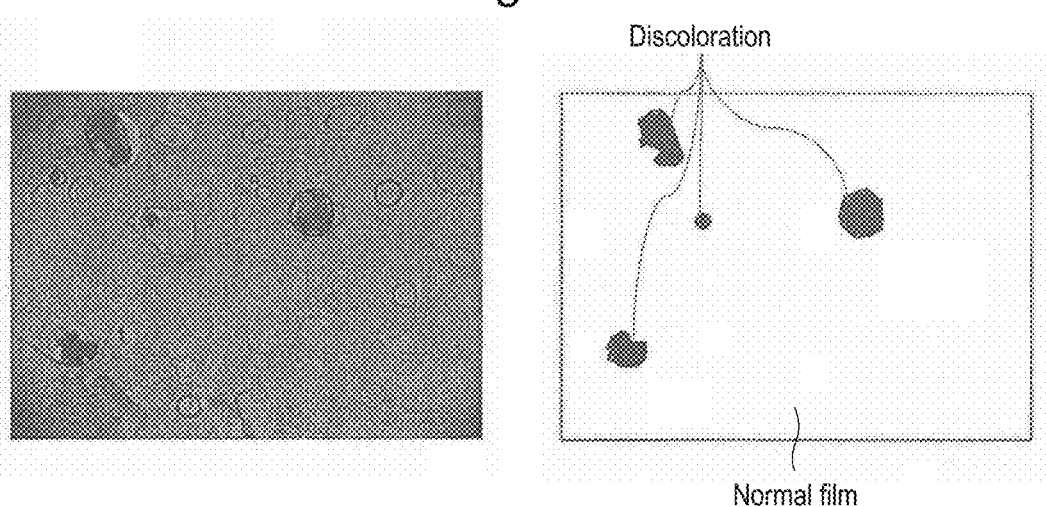
FIG. 2E shows a photograph and a phase diagram of a nickel film obtained in Example 3.
Figure 2F:
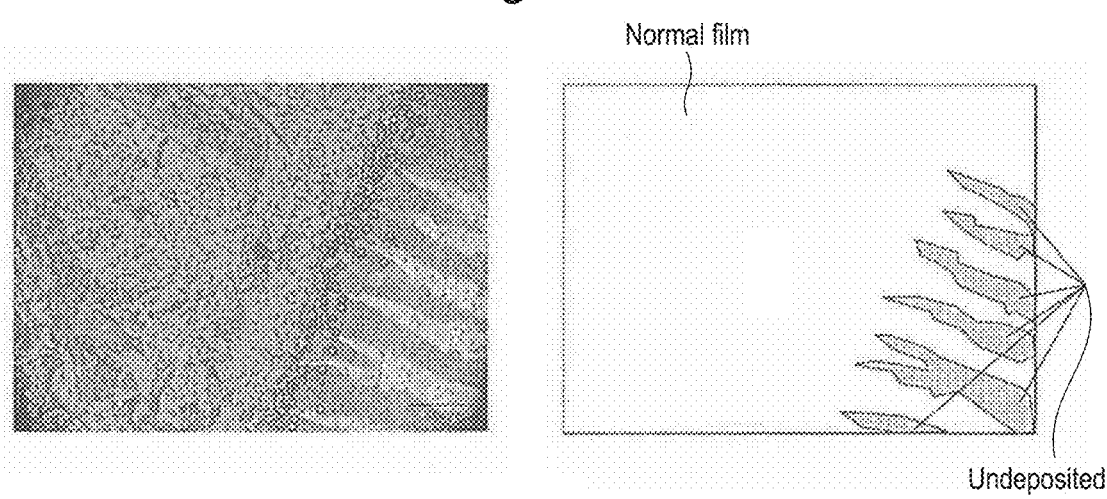
FIG. 2F shows a photograph and a phase diagram of a nickel film obtained in Example 4.

In Example 2 (chloride ion concentration: 0.06 mol/l). Example 3 (chloride ion concentration: 0.02 mol/l), and Example 4 (chloride ion concentration: 0.01 mol/l), as shown in FIG. 2D to FIG. 2F, respectively, the areas of the normally formed nickel films were significantly increased.

Figure 2G:
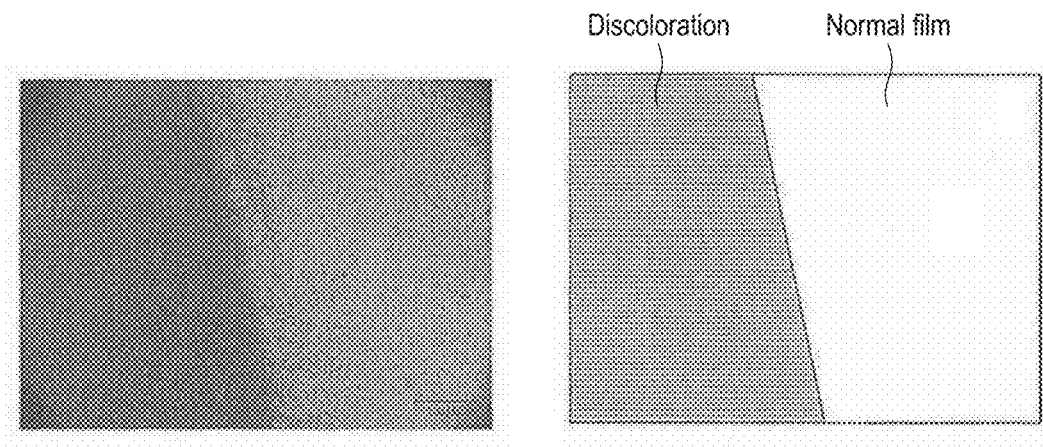
FIG. 2G shows a photograph and a phase diagram of a nickel film obtained in Example 5.

In Example 5 (chloride ion concentration: 0.002 mol/l), as shown in FIG. 2G, the discoloration region increased. It is presumed that one of the reasons why the discoloration region increased is because the anode (i.e., a pure nickel foil) was not sufficiently dissolved due to the lowered chloride ion concentration.

Figure 3:
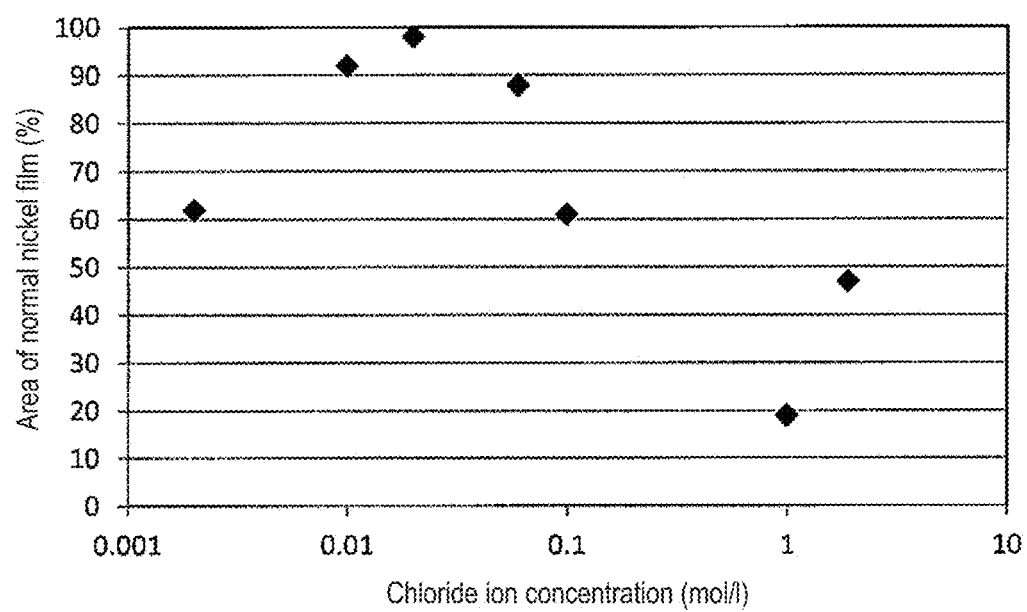
FIG. 3 shows a correlation between the chloride ion concentration in the nickel solution and the area of a normal nickel film.

FIG. 3 shows a correlation between the chloride ion concentration in the nickel solution and the area of a normal nickel film. As shown in FIG. 3, the area of a normally formed nickel film increases when the chloride ion concentration in the nickel solution is 0.002 to 0.1 mol/l, and, in particular, 0.01 to 0.06 mol/l.

Figure 4:
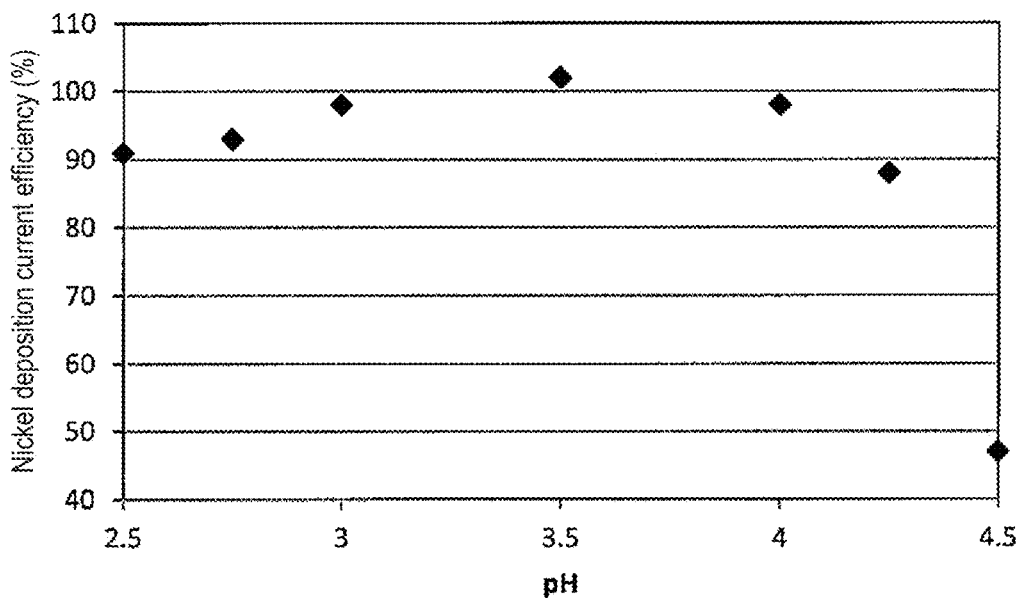
FIG. 4 shows a correlation between a pH level of the nickel solution and the nickel deposition current efficiency.

FIG. 4 shows a correlation between a pH of the nickel solution and the nickel deposition current efficiency. As shown in FIG. 4, the nickel deposition current efficiency is improved when a pH of the nickel solution is 2.5 to 4.25, and, in particular, 3 to 4.

[Nickel Film Evaluation Method 2]

The residual stress of the nickel film was determined in accordance with the method described in the Journal of the Adhesion Society of Japan, Vol. 39, No. 1, pp. 24-29, 2003 and in accordance with the following equation:

$$\sigma_r = \frac{E_s d_s}{12} \cdot \frac{F(m,n)}{n(n+1)} \cdot \left(\frac{1}{R_a} - \frac{1}{R_b}\right)$$

wherein $\sigma_r$ indicates a residual stress;

$E_s d_s/12 \cdot F(m,n)/n(n+1)$ indicates a film/substrate rigidity ratio; and $1/R_a - 1/R_b$ indicates a radius of curvature.

[Evaluation Results 2]

Figure 5:
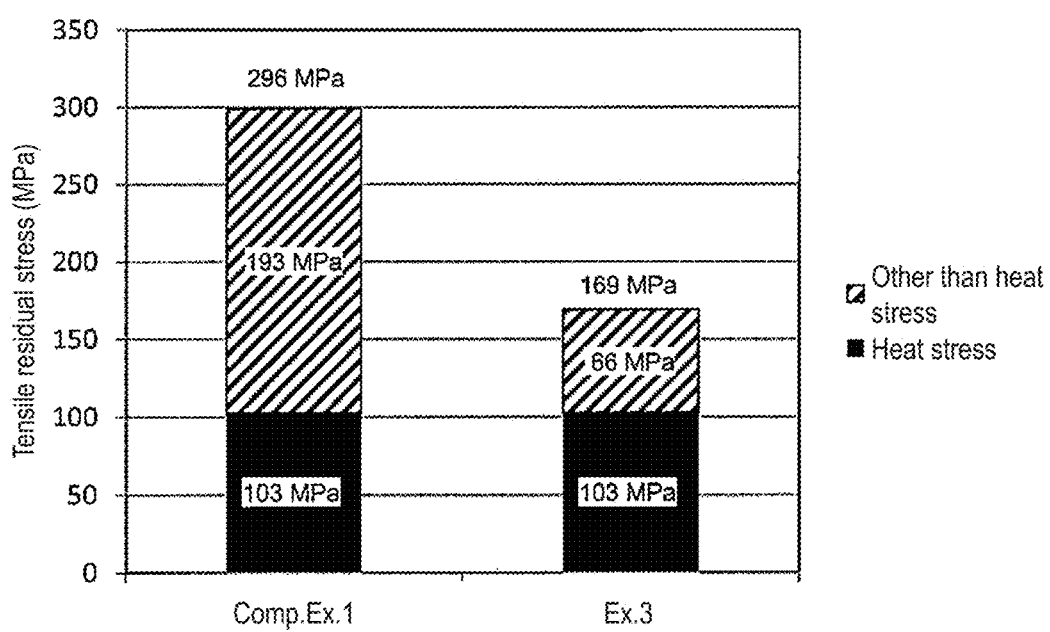
FIG. 5 shows the results of evaluation of residual stress of the nickel films obtained in Comparative Example 1 and Example 3.

FIG. 5 shows the results of evaluation of residual stress of the nickel films obtained in Comparative Example 1 and Example 3. The heat stress was determined on the basis of the difference (55° C.) between the temperature at the time of film formation and room temperature and the difference between the linear expansion coefficient of the nickel film and the linear expansion coefficient of the metal substrate. As shown in FIG. 5, the residual stress was 296 MPa in Comparative Example 1 (chloride ion concentration: 1.9 mol/l), and on the other hand, it was 169 MPa in Example 3 (chloride ion concentration: 0.02 mol/l). By lowering the chloride ion concentration in the nickel solution, the residual stress can be reduced.

DESCRIPTION OF SYMBOLS

1A: film-forming apparatus; 11: anode; 13: solid electrolyte membrane; 16: power supply unit; 20: housing; 21: first accommodation unit; 22: first aperture; 30A: pressure unit; 40: loading table; 41: second accommodation unit; 42: second aperture; 43: thin film; 45: fluid; L: nickel solution; B: metal substrate (cathode); Ba metal substrate surface; Bb: metal substrate back surface; F: nickel film.

What is claimed is:

1. A method of forming a nickel film comprising:
    disposing an anode, a metal substrate that functions as a cathode, and a solid electrolyte membrane comprising a solution that consists of at least one nickel salt, at least one chloride ion source, and at least one of a solvent or a pH buffer solution, such that the solid electrolyte membrane is disposed between the anode and the metal substrate and in contact with the surface of the metal substrate; and
    applying a voltage between the anode and the metal substrate so as to form a nickel film on the surface of the metal substrate that is in contact with the solid electrolyte membrane,
    wherein the at least one chloride ion source is nickel chloride, hydrochloric acid, sodium chloride or potassium chloride,
    wherein the at least one nickel salt is selected from the group consisting of nickel chloride, nickel sulfate, and nickel acetate,
    wherein the at least one nickel salt and the at least one chloride ion source can both be nickel chloride,
    wherein the at least one nickel salt is at least the nickel sulfate and the nickel sulfate is contained in an amount of 0.900 to 0.949 mol/l, and
    wherein a concentration of chloride ions in the solution is 0.01 to 0.02 mol/l.

2. The method of forming a nickel film according to claim 1, wherein the solution has a pH level of 3 to 3.5.

3. The method of forming a nickel film according to claim 1, wherein the metal substrate is an aluminum substrate.

4. The method of forming a nickel film according to claim 1, wherein the solution has a pH level of 2.5 to 3.5.

5. The method of forming a nickel film according to claim 1, wherein the solution has a pH level of 2.5-4.25.

6. The method of forming a nickel film according to claim 1, wherein a concentration of nickel ions in the solution is 0.1 to 8 mol/l.

7. The method of forming a nickel film according to claim 1, wherein the at least one nickel salt is the nickel chloride, the nickel sulfate and the nickel acetate.

8. The method of forming a nickel film according to claim 1, wherein the pH buffer solution is acetic acid-nickel acetate buffer solution or a succinic acid-nickel succinate buffer solution.

9. A solution consisting of at least one nickel salt, at least one chloride ion source, and at least one of a solvent or a pH buffer solution,
    wherein the at least one chloride ion source is nickel chloride, hydrochloric acid, sodium chloride or potassium chloride,
    wherein the at least one nickel salt is selected from the group consisting of nickel chloride, nickel sulfate, and nickel acetate,
    wherein the at least one nickel salt and the at least one chloride ion source can both be nickel chloride, wherein the at least one nickel salt is at least the nickel sulfate and the nickel sulfate is contained in an amount of 0.900 to 0.949 mol/l,
wherein a concentration of nickel ions is 0.1 to 8 mol/l, and
wherein a concentration of chloride ions is 0.01 to 0.02 mol/l.

10. The solution according to claim 9, wherein the solution has a pH level of 3 to 3.5.

11. The solution according to claim 9, wherein the solution has a pH level of 2.5 to 3.5.

12. The solution according to claim 9, wherein the at least one nickel salt is the nickel chloride, the nickel sulfate and the nickel acetate.

13. The solution according to claim 9, wherein the pH buffer solution is acetic acid-nickel acetate buffer solution or a succinic acid-nickel succinate buffer solution.

* * * * *

UNITED STATES PATENT AND TRADEMARK OFFICE
CERTIFICATE OF CORRECTION

PATENT NO. : 11,168,405 B2
APPLICATION NO. : 15/864117
DATED : November 9, 2021
INVENTOR(S) : Yuki Sato It is certified that error appears in the above-identified patent and that said Letters Patent is hereby corrected as shown below:

On the Title Page

Item (73) Assignee, Please delete "Toyota Jidosha Kabushiki Kaisha, Aichi-ken (JP)" and insert -- Toyota Jidosha Kabushiki Kaisha, Toyota-shi, Aichi-ken (JP) --.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*